(12) United States Patent
Mooney et al.

(10) Patent No.: US 7,885,199 B2
(45) Date of Patent: Feb. 8, 2011

(54) SYSTEM AND METHOD FOR PROVIDING GROUP CALLING IN A WIRELESS NETWORK

(75) Inventors: Christopher Francis Mooney, Livingston, NJ (US); David Albert Rossetti, Randolph, NJ (US); Stanley Vitebsky, Morristown, NJ (US); Yang Yang, Parsippany, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1287 days.

(21) Appl. No.: 11/343,771

(22) Filed: Jan. 31, 2006

(65) Prior Publication Data

US 2007/0177592 A1   Aug. 2, 2007

(51) Int. Cl.
*H04W 4/00* (2009.01)
*H04W 40/00* (2009.01)
*H04W 72/00* (2009.01)
*H04L 12/26* (2006.01)
*H04L 12/28* (2006.01)

(52) U.S. Cl. ............... 370/252; 370/338; 370/390; 370/432; 455/445; 455/453; 455/518

(58) Field of Classification Search .......... 370/252, 370/338, 390, 432; 455/445, 453, 518
See application file for complete search history.

(56) References Cited

U.S. PATENT DOCUMENTS

| | | | |
|---|---|---|---|
| 6,292,670 B1 * | 9/2001 | Kauria et al. ............... 455/518 |
| 6,625,133 B1 | 9/2003 | Balachandran et al. |
| 6,647,020 B1 * | 11/2003 | Maher et al. ............... 370/432 |
| 6,662,019 B2 | 12/2003 | Kamel et al. |
| 6,725,052 B1 * | 4/2004 | Raith ............... 455/518 |
| 6,842,441 B2 | 1/2005 | Balogh et al. |
| 6,859,446 B1 | 2/2005 | Gopalakrishnan et al. |
| 6,873,854 B2 * | 3/2005 | Crockett et al. ............... 455/518 |
| 6,889,040 B1 | 5/2005 | Koo et al. |
| 6,922,561 B2 * | 7/2005 | Chen et al. ............... 455/435.1 |
| 6,925,057 B2 | 8/2005 | Cheng et al. |
| 6,944,449 B1 | 9/2005 | Gandhi et al. |
| 6,968,201 B1 | 11/2005 | Gandhi et al. |
| 6,970,447 B2 | 11/2005 | Burgess et al. |
| 6,970,926 B1 * | 11/2005 | Needham et al. ............... 709/225 |
| 6,973,081 B1 * | 12/2005 | Patel ............... 370/390 |
| 6,975,611 B1 | 12/2005 | Balachandran et al. |
| 6,996,414 B2 * | 2/2006 | Vishwanathan et al. ...... 455/518 |
| 7,035,657 B2 * | 4/2006 | Chen et al. ............... 455/518 |
| 7,184,789 B2 * | 2/2007 | Leung et al. ............... 455/519 |
| 7,295,568 B2 * | 11/2007 | Kossi et al. ............... 370/432 |
| 7,366,780 B2 * | 4/2008 | Keller et al. ............... 709/227 |

(Continued)

*Primary Examiner*—Alpus H Hsu
(74) *Attorney, Agent, or Firm*—Fletcher Yoder (57) ABSTRACT

There is provided a system and method for providing group calling in a wireless network. More specifically, in one embodiment, there is provided a method comprising receiving a request to participate a group call from a mobile device located in a wireless service area, determining whether a threshold number of other mobile devices in the wireless service area are participating in the group call, if the threshold number of the other mobile devices are participating in the group call, designating the requesting mobile device to receive a multicast transmission of the group call, and if the threshold number of other mobile devices are not participating in the group call, designating the requesting mobile device to receive a unicast transmission of the group call.

20 Claims, 5 Drawing Sheets

U.S. PATENT DOCUMENTS

| | | | |
|---|---|---|---|
| 7,369,567 B2 * | 5/2008 | Newberg et al. | 370/432 |
| 7,388,869 B2 * | 6/2008 | Butehorn et al. | 370/401 |
| 7,415,099 B2 * | 8/2008 | Qian et al. | 379/35 |
| 7,450,503 B1 * | 11/2008 | Ginjpalli et al. | 370/230.1 |
| 7,453,831 B2 * | 11/2008 | Dorenbosch et al. | 370/270 |
| 2002/0091794 A1 * | 7/2002 | Moran et al. | 709/218 |
| 2002/0141357 A1 * | 10/2002 | Park et al. | 370/328 |
| 2003/0154243 A1 | 8/2003 | Crockett et al. | |
| 2003/0187926 A1 * | 10/2003 | Karjanlahti | 709/204 |
| 2003/0211859 A1 | 11/2003 | Chen et al. | |
| 2003/0223429 A1 | 12/2003 | Bi et al. | |
| 2004/0042479 A1 * | 3/2004 | Epstein et al. | 370/432 |
| 2004/0082352 A1 * | 4/2004 | Keating et al. | 455/519 |
| 2004/0203822 A1 | 10/2004 | Vitebsky | |
| 2005/0202838 A1 | 9/2005 | Hiller et al. | |
| 2005/0272454 A1 | 12/2005 | Hiller et al. | |
| 2005/0281227 A1 | 12/2005 | Vedder et al. | |
| 2006/0007930 A1 * | 1/2006 | Dorenbosch | 370/390 |
| 2006/0046762 A1 * | 3/2006 | Yoon et al. | 455/519 |

* cited by examiner

SYSTEM AND METHOD FOR PROVIDING GROUP CALLING IN A WIRELESS NETWORK

BACKGROUND OF THE INVENTION

1. Field of the Invention

The present invention relates generally to telecommunications and, more particularly, to providing group calling in a cellular wireless network.

2. Discussion of the Related Art

This section is intended to introduce the reader to various aspects of art that may be related to various aspects of the present invention, which are described and claimed below. This discussion is believed to be helpful in providing the reader with background information to facilitate a better understanding of the various aspects of the present invention. Accordingly, it should be understood that these statements are to be read in this light, and not as admissions of prior art.

One of the paramount challenges facing modern wireless telephone systems is the rapid growth of consumer demand for data services such as Internet access, text messaging, and e-mail. In fact, consumers are demanding greater access to data-related services than ever before, and this trend is not likely to change. For example, in the coming years, consumers will likely expect their wireless telephones to provide many, if not all, of the communication features currently provided by computers (e.g., video conferencing, picture mail, etc.).

Unfortunately, building or upgrading the telecommunication infrastructure to support growing consumer demand is relatively expensive. As such, much research has been invested into determining better and more efficient methods for transmitting information over existing infrastructure and bandwidth. Multicasting is one technique that can be used to increase the transmission capability of a telecommunication system. In multicasting, one party sends information, such as a broadcast program or a group telephone call, to a number of recipients at the same time over a single multicast channel. For example, sports scores or television programs could be multicast to a number of subscribers at once.

Multicasting works well when a large number of group call participants or multicast program subscribers are located within a relatively small geographic area, because their traffic can be transmitted over the single multicast channel. Advantageously all users within the coverage area are able to receive the single copy of the information that is transmitted. However, because the multicast transmission must reach all users within the cell, the data rate of the multicast transmission is typically set low enough to accommodate even the user in the worst radio frequency ("Rf") conditions. In other words, the multicast transmission is typically sent only as fast as the slowest recipient. When there are a relatively large number of users receiving the multicast transmission, any efficiency lost to this slower data rate is typically outweighed by the bandwidth savings from having the large number of users share the single channel. However, when there are relatively few users, due to the potentially slower data rate of multicast transmissions, a multicast transmission may actually be less efficient than using traditional unicast transmissions to communicate with each of the group call participants individually.

An improved technique for providing group calling would be advantageous.

BRIEF SUMMARY OF THE INVENTION

Certain aspects commensurate in scope with the disclosed embodiments are set forth below. It should be understood that these aspects are presented merely to provide the reader with a brief summary of certain aspects the invention might take and that these aspects are not intended to limit the scope of the invention. Indeed, the invention may encompass a variety of aspects that may not be set forth below.

There is provided a system and method for providing group calling in a wireless network. More specifically, in one embodiment, there is provided a method comprising receiving a request to participate a group call from a mobile device located in a wireless service area, determining whether a threshold number of other mobile devices in the wireless service area are participating in the group call, if the threshold number of the other mobile devices are participating in the group call, designating the requesting mobile device to receive a multicast transmission of the group call, and if the threshold number of other mobile devices are not participating in the group call, designating the requesting mobile device to receive a unicast transmission of the group call.

BRIEF DESCRIPTION OF THE SEVERAL VIEWS OF THE DRAWINGS

Advantages of the invention may become apparent upon reading the following detailed description and upon reference to the drawings in which.

DETAILED DESCRIPTION OF THE INVENTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions should be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Maximizing the efficiency of the air interface in a wireless system is very important, because over-the-air bandwidth is a scarce resource. As described above, when a large number of group call participants are located within a small geographic area, their traffic can be efficiently transmitted by using a single multicast channel despite the lower data rate that may accompany the multicast transmission. However, when some of the group participants are geographically dispersed so that only a small number of them are located within any single wireless service area, such as a cell, it may become more efficient to use multiple unicast traffic channels rather than a multicast channel.

Although in this case, multiple copies of the same information may be transmitted to users in the same area, it may still be more efficient than the multicast transmission, because the average transmission rate of the unicast channel is generally higher than the rate of the multicast channel. This is the case because multicast channels typically use more transmission resources (e.g., slot usage in a Time Division Multiple Acesss ("TDMA") system such as Evolution—Data Optimized ("EVDO") or power/code usage in Code Division Multiple Access ("CDMA") systems such as Evolution—Data and Voice ("EVDV") or High Speed Downlink Packet Access ("HSDPA")) than the average unicast channel. Consequently, there exists an average number of users per cell for which it becomes more efficient to use a multicast channel (i.e., there is a break even point for multicast transmissions). If the number of users is below this break even point, it is more efficient to use unicast, whereas if the number of users is above the break even point, multicast is more efficient.

Accordingly, one or more of the embodiments described below may be directed towards a system and/or method for providing group calling in a wireless system. More specifically, one or more of the embodiments described herein may be directed towards a technique for dynamically allocating multicast and unicast channel resources for a group call depending on the user distribution. In addition, in one embodiment, there is also provided a technique for switching between multicast and unicast modes during a group call. Advantageously, the below-described techniques may provide better system-wide utilization of transmission resources (e.g., bandwidth) than can be achieved by static group call transmissions.

Figure 1:
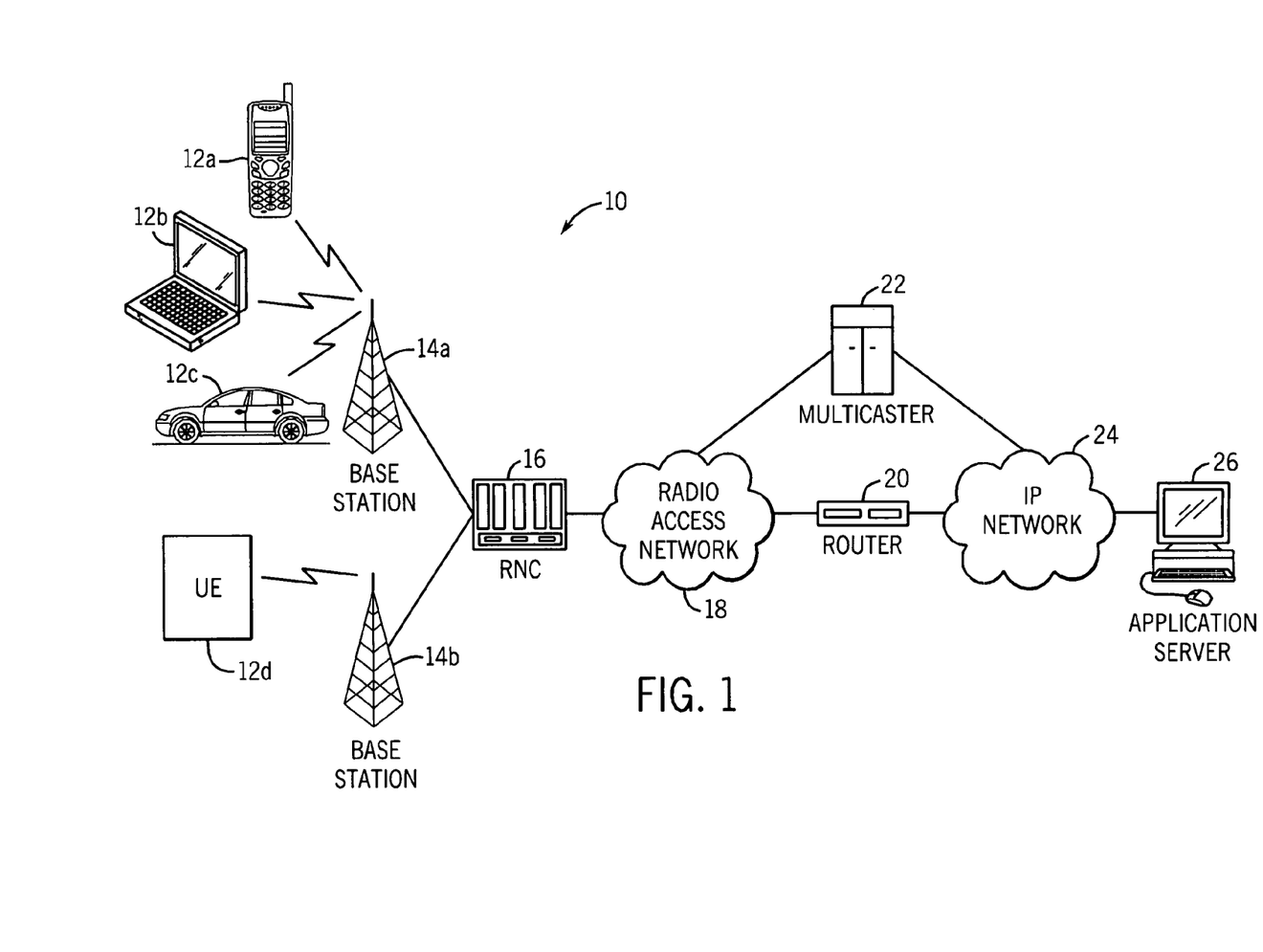
FIG. 1 is a block diagram of an exemplary wireless telephone/data system in accordance with one embodiment.

Turning now to the drawings and looking initially at FIG. 1, a block diagram of an exemplary wireless telephone/data system in accordance with one embodiment is illustrated and generally designated by a reference numeral 10. Those of ordinary skill in the art will appreciate that the wireless system 10, described below, illustrates merely one embodiment of an exemplary Evolution-Data Optimized ("EV-DO") wireless telephone/data system 10 configured to provide multicast transmissions. In alternate embodiments, other suitable EV-DO configurations may be employed in the system 10. Moreover, the techniques described herein may also be employed in a variety of other suitable wireless telephone/data systems in addition to EV-DO including, but not limited to HSPDA, CDMA 2000, EV-DV, and wideband CDMA.

In any given wireless telephone market, such as a typical metropolitan area, the wireless telephone system 10 may include one or more mobile communication devices, such as a mobile telephone 12a, a laptop computer 12b, a vehicle system 12c, and/or other user equipment 12d. The mobile devices 12a-12d may be configured to encode data received from a user and to transmit that data to base stations 14a-b. Similarly, the mobile devices 12a-12d may be configured to receive data from the base stations 14a-b. In one embodiment, the base stations 14a-b may include one or more antennas, RF transceivers, antenna interfaces, and/or controllers.

The base stations 14-b may be communicatively coupled to a Radio Network Controller ("RNC") 16. The RNC 16 may control the allocation and release of specific radio resources, including call set-up and teardown, processing of voice and data traffic, and hard and soft handoff between cells, to establish a connection between the base stations 14a-b and the mobile devices 12a-d. It will be appreciated that a single RNC 16 is illustrated in FIG. 1 for exemplary purposes only. As such, in alternate embodiments, the system 10 may include multiple RNCs 16, each of which is configured to communicate with one or more base stations 14a-b. In one embodiment, the RNC 16 may include a modified version of the Flexent Radio Network Controller manufactured by Lucent Technologies.

The mobile devices 12a-d may be configured to periodically register with the RNC 16 and identify themselves as members of a particular group call. This identification could be explicit or implicit (e.g., involve the RNC 16 querying a user profile database where group subscription information is stored). This registration, which is described in more detail in regard to FIG. 2, may be triggered by a variety of suitable conditions, including, but not limited to, a change in geographic location, crossing a cell boundary or other defined boundary, the expiration of timer, and/or a directive from the RNC 16 or other component in the system 10. Registration could be enabled for all mobiles or localized to the mobiles that are allowed to receive a particular type of content. In another embodiment, the mobile devices 12a-d may be configured to only perform a single registration at the time when the call is started.

Amongst other things, the registration provides the RNC 16 with location information about the registering mobile device (e.g., mobile device 12a is in cell 001). The RNC 16 may be configured to store this location information. Alternatively, in another embodiment, the RNC 16 may use responses to paging or to a particular signaling message related to an invitation to join a group call as means of identifying user location. In still another embodiment, the RNC 16 may be configured to use the global positioning system or another suitable location identifying system. Moreover, in yet another alternate embodiment, another component of the system 10 besides the RNC 16 is configured to determine and/or store the location information.

The RNC 16 may be coupled to one or more components of a radio access network ("RAN") 18. In various embodiments, the RAN 18 may include a packet control function system, a mobile switching center, and/or other systems to relay telephone calls or data between the RNC 16 and a router 20 and a multicaster 22. The router 20 may be configured to route packetized data between the RAN 18 and an IP network 24, such as the Internet. In CDMA2000/EV-DO embodiments, the router 20 may include a packet data serving node ("PDSN"); whereas in HSDPA embodiments, the router 20 may include a Gateway GPRS Support Node ("GGSN"). In still other embodiments, the router 20 may include other suitable components.

The multicaster 22 allows the traffic destined to be multicast to bypass the router 20 and, thus, reduces the amount of duplicate traffic content within the system 10. More specifically, the multicaster 22 may be configured to receive a single copy of information to be distributed via a multicast transmission and to forward this information to the one or more RNCs 16 that will transmit the particular multicast. In some embodiments, however, the multicaster 22 may be omitted from the system 10. In these embodiments, the traffic that is to be multicast may be transmitted to all of the RNCs 16 via the router 20. Further, the traffic that is to be multicast may be transmitted to all of the RNCs 16 via the router 20 in embodiments where the router 20 and the multicaster 22 are integrated into a single unit.

Lastly, the system 10 may also include an application server 26, which is configured to support or provide various data or information services to the mobile devices 12a-d. As those of ordinary skill in the art will appreciate, the application server 26 may be configured to provide any one of a number of suitable services, such as video programming, text messaging, data services, voice services, internet/web page services, email, and so forth. As will be described further below, the application server 26 may be configured to provide the information or data that will be multicast or unicast (as appropriate) to the mobile devices 12a-d. In some embodiments, the application server 26 is aware that the services to some members of the group are provided via multicast in the RAN 18. In other embodiments, however, the decision to use multicast is fully confined within the RAN 18. In these embodiments, the application server 26 is not aware that the multicast is used at all. In such cases, the application server 26 sends information to all members of the group call in the same manner as it would if all users were unicast, and the RAN 18 is configured to discriminate in the treatment of this information for multicast and unicast users. As such, in these embodiments, the application server 26 may also be simplified to not account for both multicast and unicast transmissions.

Figure 2:
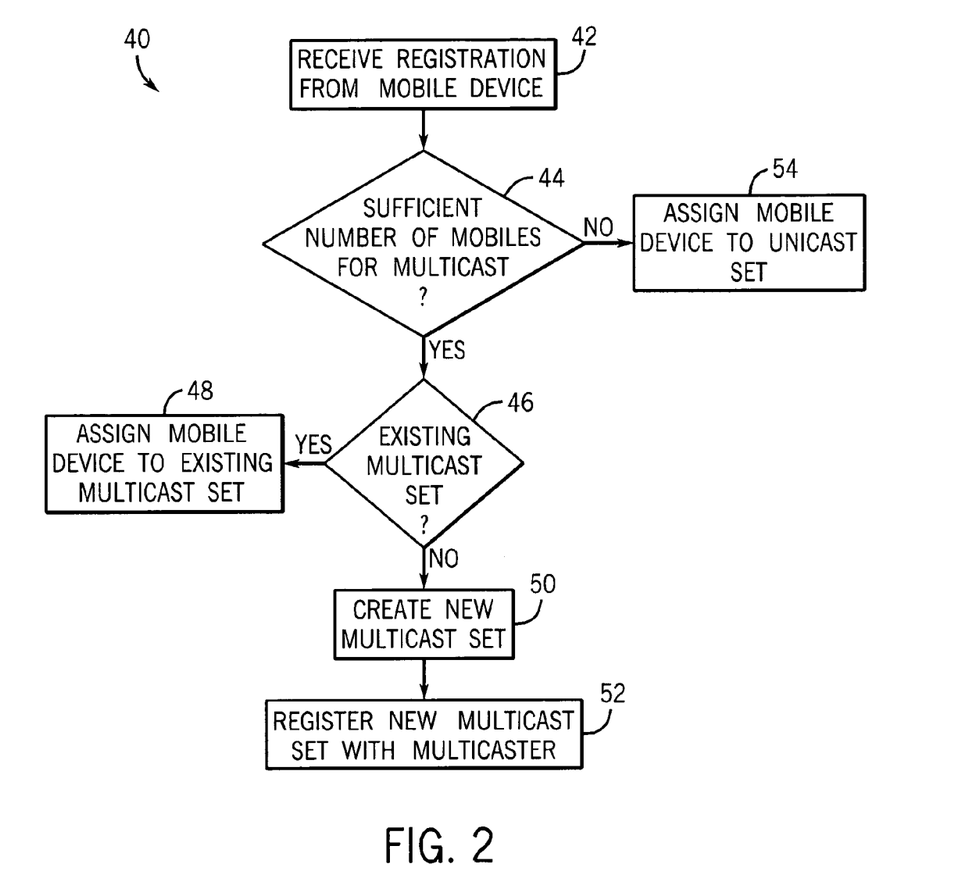
FIG. 2 is a flow chart illustrating an exemplary technique for mobile device registration in accordance with one embodiment.

As described above, the mobile devices 12a-d may be configured to register with the RNC 16 prior to participating in a group call. For example, FIG. 2 is a flow chart illustrating an exemplary technique 40 for mobile device registration in accordance with one embodiment. In one embodiment, the RNC 16 may be configured to execute the technique 40 each time one of the mobile device 12a-d registers or reregisters with it. At the time of registration, the RNC 16 determines whether the flow should be served by a multicast or a unicast. It will be appreciated, however, that the same flow could be served by both a multicast and a unicast in different cells belonging to the same RNC 16.

As illustrated by block 42 of FIG. 2, the technique 40 may begin with the RNC 16 receiving a new registration or a registration update from one of the mobile devices (12a for example). The technique 40 may also include determining whether there are at least a threshold number (N) of the mobile devices 12a-d registered for the same group call in one wireless service area, such as a cell or a plurality of closely located cells, belonging to the RNC 16, as indicated by block 44. If the number of mobile devices 12a-d exceeds the threshold number, the RNC 16 makes a decision to support a multicast transmission within this particular cell or group of cells. The threshold N of mobile device 12a-d that warrants a multicast transmission may be a tunable parameter, which is defined by a resource efficiency threshold between multicast and unicast transmission modes. However, as an example, in one embodiment, the RNC 16 will decide to support a multicast transmission if the number of mobile devices 12a-d on the same group call within the cell is equal to or greater than a threshold of five. In another embodiment, the threshold N could be determined adaptively by monitoring real or projected resource utilization of users located within cell coverage and comparing the amount of resources (time-slots, codes, power) they would use in unicast and multicast modes. In this embodiment, the threshold N would very from cell to cell as a function of particular distribution of RF conditions experienced by the mobiles devices 12a-d in each cell.

If there are a sufficient number of mobile devices 12a-d to support a multicast transmission, the RNC 16 may determine whether there is an already existing multicast set for the group call, as indicated in block 46. If there is already an existing multicast set, the RNC 16 may assign the mobile device 12a to the existing multicast group, as indicated by block 48. If, on the other hand, there is no existing multicast set, the RNC 16 may create a new multicast set (block 50) and register the new multicast set with the multicaster 22, as indicated by block 52.

The multicaster 22 stores the RNC IP addresses for each multicast set. Further, the multicaster 22 may also indicate to the application server 26 which RNC 16 to send the content when it arrives. It will be appreciated that the mapping between group calls and multicast sets may be accomplished via communication between the application server 26 and multicaster 22, or alternatively, the application server 26 may be configured to transmit multicasts to all RNCs 16 and allow each particular RNC 16 to decide whether or not to use the packets for a multicast.

Returning to block 44, if there are not a sufficient number of mobile device 12a-d for a multicast, the RNC 16 may assign the mobile device 12a to a unicast set, as indicated by block 54. Further, if there are no candidates for multicast mode remaining among members of a particular group call after assigning the mobile device 12a to the unicast set, the RNC 16 may also be configured to deregister that multicast set from the multicaster 22 (not shown). In one embodiment, this deregistration is delayed by a fixed period of time to avoid ping-ponging in the establishment and teardown of multicast sets.

Figure 3:
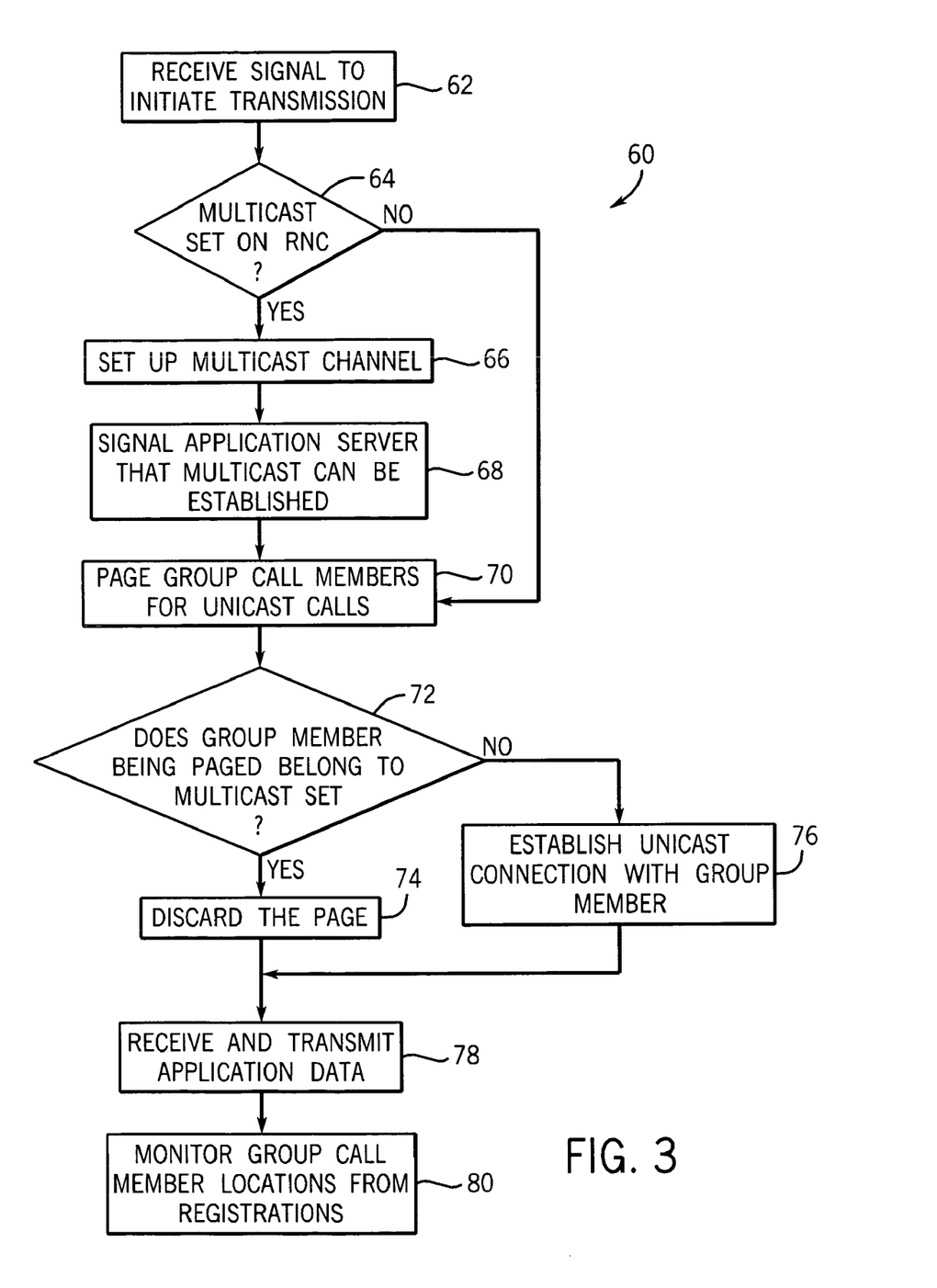
FIG. 3 is a flow chart illustrating one exemplary technique for establishing a group call in accordance with one embodiment.
Figure 4:
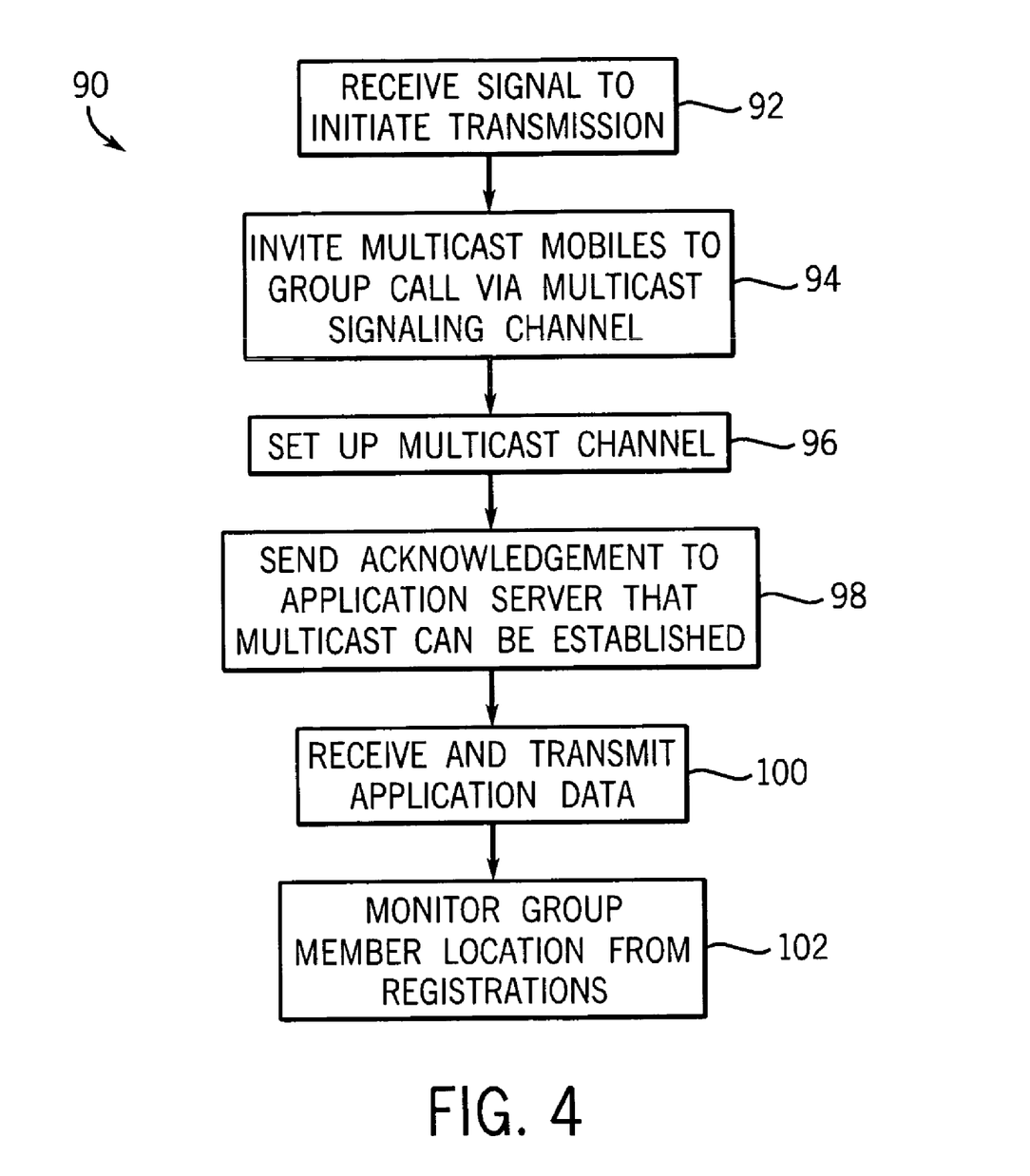
FIG. 4 is flow chart illustrating another exemplary technique for establishing a group call in accordance with one embodiment.

Once one or more of the mobile device 12a-d have registered with the RNC 16, the RNC 16 may be configured to initiate a group call. FIGS. 3 and 4 illustrate two exemplary techniques that the RNC 16 may employ to initiate a group call in the system 10. First, FIG. 3 is a flow chart illustrating one exemplary technique 60 for establishing a group call in accordance with one embodiment. As illustrated by block 62 of FIG. 3, the technique 60 may begin with the RNC 16 receiving a signal from the application server 26 to begin transmitting content to the participants in the group call. In one embodiment, receiving the signal from the application server involves receiving application layer signaling. If the RNC 16 has any multicast sets associated with the group call (block 64), the RNC 16 may set-up a multicast channel in the cell or cells covering the area where the mobile devices 12a-d in the multicast set or sets are located, as indicated in block 66. In one embodiment, the RNC 16 may set-up the multicast channels by sending standard specific signaling messages to the mobile devices 12a-d and allocating air interface resources for the multicast traffic (e.g., slot interlace multiplexes in EV-DO).

Next, the RNC 16 may send an acknowledgment to the application server 26 indicating that a multicast transmission can be established, as indicated in block 68. After transmitting the acknowledgement indicating that the multicast can be established, the RNC 16 may page the mobile devices 12a-d that are members of the group call, as indicated in block 70. The paging area determination may be assisted by registration information available to the RNC 16.

Next, the RNC 16 may determine whether each of the group call members (i.e., the mobile devices 12a-d that are in the group call) that were paged belong to the multicast set, as indicated by block 72. If a particular one of the mobile devices 12a-d is in the multicast set, the RNC 16 will omit the paging procedures for that mobile device and drop the packets containing application signaling (block 74).

Dropping the packets associated with the mobile devices 12a-d that are assumed to be in the multicast mode, however, may have repercussions for supporting other calls to these users that may be being initiated at the same time. As such, in one embodiment, the application server 26 may or may not block additional call setups from proceeding during this time depending on implementation, call priority, etc. Alternatively, if the application server is not configured to completely block these additional setups, the RNC 16 may be configured to take the following steps. First, setups could be discarded only for a certain period of time (e.g., 10 seconds) following the multicast establishment. This delay would allow subsequent attempts by the application server 26 or the mobile device 12a-d to go through. Second, packets containing call setup signaling for other calls could be identified using different application identifier from the one used for the initial setup.

In addition, dropping the unicast signaling could also result in missing any of the mobile devices 12a-d that move outside the multicast area while the group call was being setup and have not registered yet in the new location. In one embodiment, the probability of missing these mobile devices 12a-d is reduced by configuring the RNC 16 to ensure that the multicast area has enough neighboring cell margin and/or by configuring the RNC 16 to hold on to unicast pages until the next registration by the mobile device 12a-d to ensure that the mobile device 12a-d is in the multicast area before unicast signaling is dropped.

Returning to block 72 of FIG. 3, if the group member (i.e., the mobile devices 12a-d that are in the group call) being paged did not belong to the multicast set, the RNC 16 may establish a unicast connection with the group member, as indicated by block 76. Next, as indicated by block 78, the RNC 16 may then be configured to receive application data (e.g., the video programming, group telephone call, or so forth) from the application server 26. Once received, the RNC 16 will transmit this information either over the multicast channel or over one or more unicast channels, as appropriate for the mobile devices 12a-d in each of its cells. Lastly, the RNC 16 may be configured to continue to monitor group member locations from their registrations, as will be described further below in regard to FIGS. 5 and 6 (block 80).

Looking next to FIG. 4, a flow chart illustrating another exemplary technique for establishing a group call in accordance with one embodiment is illustrated and generally designated by a reference numeral 90. In one embodiment, the RNC 16 may be configured to execute the technique 90 in place of the technique 60 described above in relation to FIG. 3.

As indicated by block 92 of FIG. 4, the technique 90 may begin with the RNC 16 receiving signal from the application server 26 to begin transmitting content to the participants in the group call. In one embodiment, the application server 26 is configured to send application layer signaling to all RNCs 16 that have group members registered in either a multicast or unicast set or to all of the RNCs 16 that have a multicast signaling channel enabled. Next, the RNC 16 may be configured to invite the mobile devices 12a-d in the multicast set to the group call via a multicast signaling channel, as indicated by block 94. The multicast signaling channel is a pre-established signaling channel that is known beforehand to all of the mobile devices 12a-d in the group call and is continuously monitored by mobile devices 12a-d in the multicast set.

If the RNC 16 has any mobile devices in a multicast set, the RNC 16 may then be configured to set-up a multicast channel, as indicated by block 96. In one embodiment, the RNC 16 may be configured to send out standard specific signaling messages to the mobile devices 12a-d in the multicast set and/or to allocate air interface resources for the multicast traffic (e.g., slot interlace multiplexes in EV-DO). Further, the RNC 16 may also be configured to send an acknowledgement ("ACK") to the application server 26 indicating that a multicast can be established, as indicated by block 98.

Next, as indicated by block 100, the RNC 16 may then be configured to receive application data (e.g., the video programming, group telephone call, etc.) from the application server 26. Once received, the RNC 16 will transmit this information either over the multicast channel or over one or more unicast channels, as appropriate for the mobile devices 12a-d in each of its cells. Lastly, the RNC 16 may be configured to continue to monitor group member locations from their registrations (block 102), as will be described further below in regard to FIGS. 5 and 6. It will be appreciated that unlike the technique 60 described in regard to FIG. 3, the technique 90 avoids the packet dropping problems discussed above, because of the express multicast signaling. However, to achieve this signaling, the technique 90 employs a multicast signaling channel not employed in the technique 60.

Figure 5:
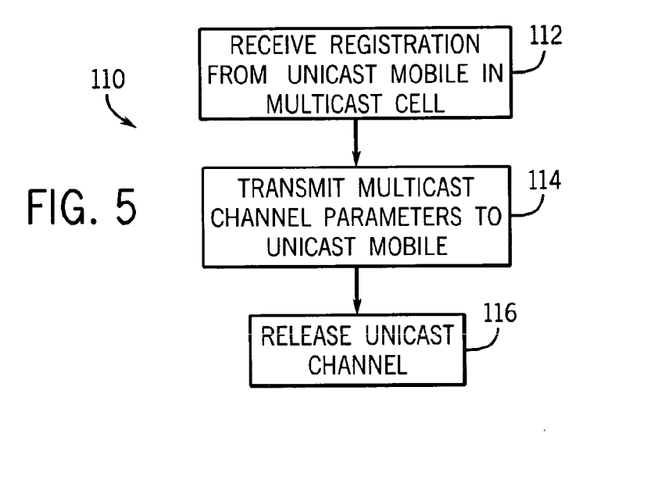
FIG. 5 illustrates a flow chart of an exemplary technique for providing group calling when a unicast mobile device moves into a cell where the group call is being multicast in accordance with one embodiment.
Figure 6:
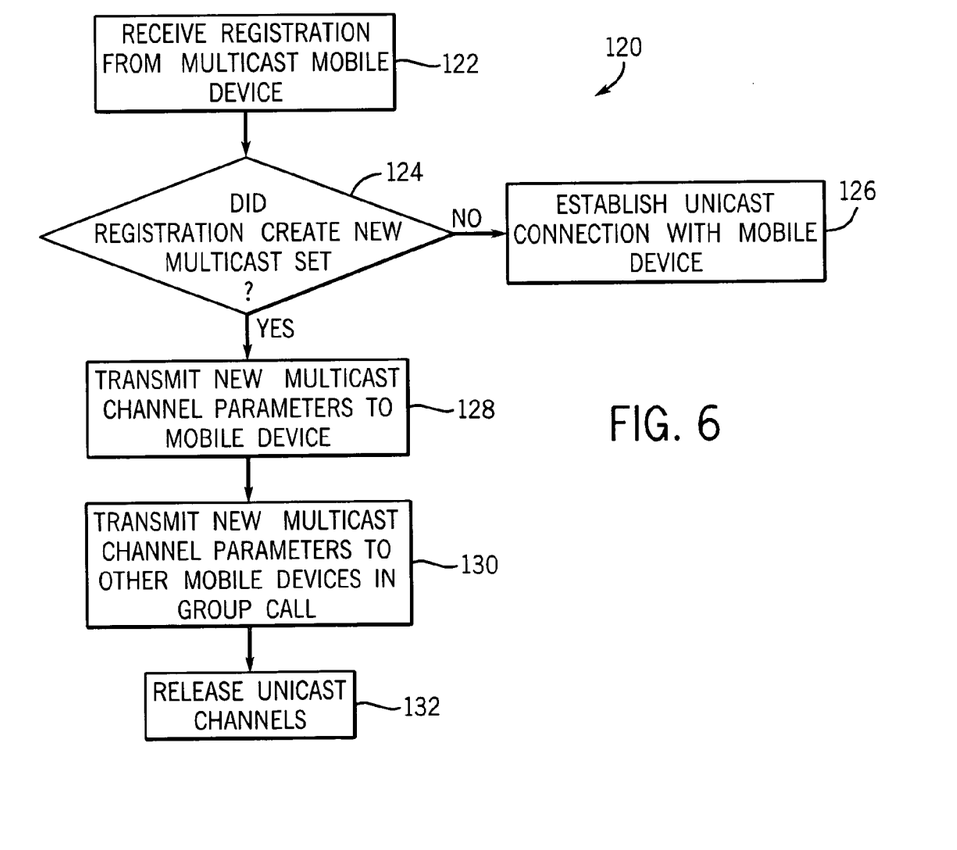
FIG. 6 illustrates a flow chart of an exemplary technique for providing group calling to a multicast mode mobile device that moves into a cell where the group call is not being multicast in accordance with one embodiment.

Looking next to FIGS. 5 and 6, once a group call is initiated, one or more of the mobile devices 12a-d, may move amongst the cells of one RNC or between RNCs 16. In doing so, the mobile device 12a-d may move between some cells that are employing multicast transmissions and some cells that are employing unicast transmissions. Accordingly, FIGS. 5 and 6 illustrate techniques that may be employed by the RNC 16 when a unicast mobile device 12a-d moves into a cell where a group call is being multicast and vice-versa.

First, FIG. 5 illustrates a flow chart of an exemplary technique 110 for providing group calling when a unicast mobile device moves into a cell where the group call is being multicast in accordance with one embodiment. The technique 110 may begin with the RNC 16 receiving a registration from a unicast mode mobile device (12c, for example) in a cell where the group call is being multicast, as indicated in block 112. The RNC 16 may transmit the multicast channel parameters to the mobile device 12c, as indicated in block 114. Then, after a suitable period of time, the RNC 16 may release the unicast channel to the mobile device 12c, as indicated by block 116.

Moreover, in one embodiment, the RNC 16 may be configured to await a confirmation from the mobile device 12c before releasing the unicast channel. Alternatively, the mobile device 12c may be configured to notify the application server 26 to stop transmitting over the unicast channel once the mobile device 12c has started receiving the multicast transmission. In this case, the unicast channel would go dormant and be released automatically after the expiration of a dormancy timer, as will be appreciated by one of ordinary still in the art.

Alternatively, FIG. 6 illustrates a flow chart of an exemplary technique 120 for providing group calling to a multicast mode mobile device (12b, for example) that moves into a cell where the data belonging to the group call is not being multicast in accordance with one embodiment. The technique 120 may begin with the RNC 16 receiving a registration from the multicast mode mobile device 12b in a cell where the group call is being unicast, as indicated in block 122. Next, the RNC 16 may determine whether the registration of the mobile device 12c caused a new multicast set to be created in the cell (see blocks 46-52 of FIG. 2), as indicated by block 124. If a new multicast set was not created upon registration, the RNC 16 may establish a unicast connection with the mobile device 12b, as illustrated by block 126.

If, however, a new multicast set was created by the registration of the mobile device 12b, the RNC 16 may transmit the multicast channel parameters for the newly created multicast set to the mobile device 12*b*, as indicated by block 128. Next, as indicated by block 130, the RNC 16 may identify other member of the group call within the cell and transmit the multicast channel parameters to the other member of the group call (the mobile devices 12*a* and 12*c*, for example). Lastly, as indicated by block 132, after a suitable period of time, the RNC 16 may release the unicast channels that were formerly in use by the mobile devices 12*a* and 12*c* in a manner similar to those discussed above in regard to block 116 of FIG. 5.

In still another embodiment, the mobile devices 12*a-d* may also be configured to signal to the RNC 16 if they lose multicast coverage, so that the RNC 16 may either switch the mobile devices 12*a-d* to unicast channel or extend the multicast area into other cells. For example, the mobile device 12*a-d* may be configured to request that the RNC 16 establish a unicast channel prior to the complete loss of multicast coverage. More specifically, in one embodiment, the mobile devices 12*a-d* may be configured to measure the RF signal strength and request to establish a unicast if the RF signal strength dips below a threshold level.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

We claim:

1. A method comprising:
receiving a request to participate in a group call from a mobile device located in a wireless service area;
determining whether a threshold number of other mobile devices in the wireless service area are participating in the group call, wherein the threshold number of other mobile devices in the wireless service area comprises a tunable parameter associated with a resource efficiency breakpoint between multicast and unicast transmission modes;
if the threshold number of the other mobile devices are participating in the group call, designating the requesting mobile device to receive a multicast transmission of the group call; and
if the threshold number of other mobile devices are not participating in the group call, designating the requesting mobile device to receive a unicast transmission of the group call.

2. The method, as set forth in claim 1, wherein receiving the request to participate in the group call comprises receiving a request to participate in the group call from a mobile device located within a wireless cell.

3. The method, as set forth in claim 1, comprising:
determining whether the wireless service area has a multicast set associated with the group; and
if the wireless service area has a multicast set associated with the group, assigning the mobile device to the multicast set if the requesting mobile device is designated to receive the multicast transmission.

4. The method, as set forth in claim 3, comprising:
if the wireless service area does not have a multicast set associated with the group call, creating a new multicast set associated with the group call; and
assigning the requesting mobile device to the new multicast set.

5. The method, as set forth in claim 1, comprising:
setting up a multicast channel in the wireless service area;
receiving application data associated with the group call from a multicaster; and
transmitting the application data over the multicast channel.

6. The method, as set forth in claim 1, comprising:
paging the mobile devices in the wireless service area that have joined the group call;
discarding the pages intended for the mobile devices designated for a multicast of the group call; and
establishing a unicast connection with the mobile devices designated for a unicast of the group call.

7. The method, as set forth in claim 1, comprising:
signaling mobile devices designated for the multicast of the group call, wherein the signaling is performed over a multicast signaling channel;
establishing a multicast channel;
receiving application data associated with the group call; and
transmitting the application data over the multicast channel.

8. The method, as set forth in claim 1, wherein receiving the request comprises receiving registration information.

9. The method, as set forth in claim 1, comprising:
detecting that one of the mobile devices has left the wireless service area; and
establishing a unicast connection with the departed mobile device in another wireless service area.

10. A communication device configured:
to receive a request to participate in a group call from a mobile device located in a wireless service area;
to determine whether a threshold number of other mobile devices in the wireless service area are participating in the group call, wherein the threshold number of other mobile devices in the wireless service area comprises a tunable parameter associated with a resource efficiency breakpoint between multicast and unicast transmission modes;
to designate the requesting mobile device to receive a multicast transmission of the group call, if the threshold number of the other mobile devices are participating in the group call; and
to designate the requesting mobile device for a unicast of the group call if the threshold number of the other mobile devices are not participating in the group call.

11. The communication device, as set forth in claim 10, wherein the communication device comprises a radio network controller.

12. The communication device, as set forth in claim 10, wherein the communication device is configured:
to determine whether the wireless service area has a multicast set associated with the group; and
to assign the mobile device to the multicast set if the wireless service area has a multicast set associated with the group.

13. The communication device, as set forth in claim 10, wherein the communication device is configured:
to establish a multicast channel; and
to transmit a group call to the mobile device over the multicast channel.

14. A method comprising:
receiving a request to participate in a group call from a mobile device located in a wireless service area;
determining whether a threshold number of other mobile devices in the wireless service area are participating in the group call, wherein the threshold number of other mobile devices in the wireless service area comprises a dynamically adapted parameter associated with a resource efficiency breakpoint between multicast and unicast transmission modes;

if the threshold number of the other mobile devices are participating in the group call, designating the requesting mobile device to receive a multicast transmission of the group call; and if the threshold number of other mobile devices are not participating in the group call, designating the requesting mobile device to receive a unicast transmission of the group call.

15. The method, as set forth in claim 14, comprising:
determining whether the wireless service area has a multicast set associated with the group; and
if the wireless service area has a multicast set associated with the group, assigning the mobile device to the multicast set if the requesting mobile device is designated to receive the multicast transmission.

16. The method, as set forth in claim 15, comprising:
if the wireless service area does not have a multicast set associated with the group call, creating a new multicast set associated with the group call; and
assigning the requesting mobile device to the new multicast set.

17. The method, as set forth in claim 14, comprising:
setting up a multicast channel in the wireless service area;
receiving application data associated with the group call from a multicaster; and
transmitting the application data over the multicast channel.

18. The method, as set forth in claim 14, comprising:
paging mobile devices in the wireless service area that have joined the group call;
discarding the pages intended for the mobile devices designated for a multicast of the group call; and
establishing a unicast connection with the mobile devices designated for a unicast of the group call.

19. The method, as set forth in claim 14, comprising:
signaling mobile devices designated for the multicast of the group call, wherein the signaling is performed over a multicast signaling channel;
establishing a multicast channel;
receiving application data associated with the group call; and
transmitting the application data over the multicast channel.

20. The method, as set forth in claim 14, comprising:
detecting that one of the mobile devices has left the wireless service area; and
establishing a unicast connection with the departed mobile device in another wireless service area.

* * * * *